No. 878,599. PATENTED FEB. 11, 1908.
G. BAUSCH.
EYEGLASSES OR SPECTACLES.
APPLICATION FILED AUG. 18, 1904.

Witnesses
Hatter B. Payne

Inventor
George Bausch
By
Frederick S. Church
Attorney

UNITED STATES PATENT OFFICE.

GEORGE BAUSCH, OF SYRACUSE, NEW YORK.

EYEGLASSES OR SPECTACLES.

No. 878,599.      Specification of Letters Patent.      Patented Feb. 11, 1908.

Application filed August 18, 1904. Serial No. 221,244.

*To all whom it may concern:*

Be it known that I, GEORGE BAUSCH, of Syracuse, in the county of Onondaga and State of New York, have invented certain new and useful Improvements in Eyeglasses or Spectacles; and I do hereby declare the following to be a full, clear, and exact description of the same, reference being had to the accompanying drawings, forming a part of this specification, and to the reference-numerals marked thereon.

My present invention relates to improvements in eyeglasses or spectacles, and the purpose of my invention is to provide a device of this character which is capable of adjusting itself to those portions of the wearer's nose upon which it may bear in order that the eyeglasses or spectacles may be firmly and accurately supported in position with the least pressure and discomfort to the wearer.

It is also an object of my invention to enable a device of this kind to be produced inexpensively and which is capable of use in various forms, and to these and other ends it consists in certain improvements, and combinations and arrangements of parts that will be hereinafter more fully explained, the novel features being pointed out particularly in the claims hereunto annexed.

Figure 1:
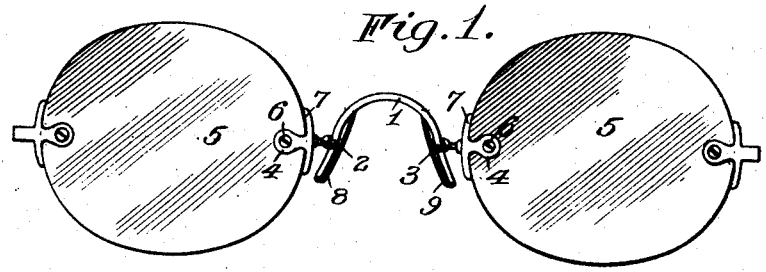
Figure 2:
Figure 3:

In the drawings: Figure 1 is a front view of a spectacle or eyeglass to which my present invention has been applied. Fig. 2 is a view of the same, looking from the top, and Fig. 3 is a detail perspective view of the nose guard detached from the mounting.

In these views the same numerals of reference designate similar parts.

My present invention is particularly applicable to that class of eyeglasses wherein the usual lenses are connected by a relatively stiff or rigid bridge which is formed to bear upon or rest in immediate proximity to the bridge of the wearer's nose, and it embodies generally the bridge 1 the central portion of which is arched to the proper degree to conform to the contour of that portion of the wearer's nose upon which it is adapted to rest, the respective ends of the bridge in the present instance being extended approximately horizontally and rearwardly to form the hinge pintles or journals 2 and 3. These extremities of the bridge are then doubled forwardly and are attached in a suitable manner to the lens attaching devices which latter may be of any desirable construction, such devices usually consisting of the opposing clamps 4—4 which are secured upon the opposite faces of the lenses 5 by means of the screw 6, the ears 7—7 being usually provided for engaging the inner edges of the lenses and thereby securing the lenses in fixed relation.

The hinge pintles or journals 2 and 3 formed upon the bridge preferably extend in a direction approximately perpendicular to the plane of the lenses, or they may be adjusted to extend substantially parallel to the sides of that portion of the wearer's nose to which they are to be applied, and upon these pintles are journaled the nose guards 8 and 9, which are capable of turning about the journal portions of the bridge in planes approximately parallel to the plane of the lenses.

Many different forms of guards may be applied to the mounting in the manner above described, the guards employed in the present instance being particularly advantageous for the reason that they may each be formed of a substantially straight strip of sheet metal or other suitable material, one end of which is partially doubled upon the remainder of the strip and the extremity of the doubled portion may be rolled or otherwise formed into a hinge or bearing portion adapted to fit upon the journal portions of the mounting, and this enables the guards to be readily and inexpensively formed from sheet material, and also places the bearing or rolled portion of the guard very close to the nose engaging portion thereof, and consequently when the bridge is fitted to the wearer's nose it need not be unusually wide or large in order to accommodate the guards between it and the sides of the nose. The doubled portion of each guard affords an adjustment by means of which the height of the guards may be varied, but it will be understood of course that I do not limit myself to the use of a particular form of guard, and that various forms may be used as will be found advantageous.

Eyeglasses or spectacles provided with my improvements are particularly desirable for supporting and positioning themselves upon the wearer's nose, for it will be observed that the freely movable nose guards will readily and accurately bear upon the nose with evenly distributed pressure, as they automatically move into proper position so that their nose engaging surfaces conform to those portions of the nose upon which they bear, and it is obvious that they may be readily and inexpensively manufactured and applied to the various forms of eyeglass or spectacle mountings.

I claim as my invention:—

1. In eyeglasses, a bridge having a portion forming a hinge pintle, and a nose-guard having a hinge portion adapted to coöperate therewith.

2. In eyeglasses or spectacles, the combination with the lenses, of a bridge attached thereto embodying a strip having intermediate portions adapted to form pintles, and nose-guards having bearings thereon arranged to turn on said pintles of the bridge as axes.

3. In eyeglasses or spectacles, the combination with the lenses and a bridge having a bowed central portion adapted to span the wearer's nose, the ends of the bowed portion extending rearwardly, and thence forwardly to the lenses, of a nose guard journaled to turn on the rearwardly-extending arms of the bridge.

4. In eyeglasses or spectacles, the combination with a bridge having pintles formed thereon, of nose-guards each embodying a nose-engaging surface, and a hinge portion arranged thereon intermediate the length of the nose-engaging surface and coöperating with the pintle on the bridge.

5. In eyeglasses or spectacles, the combination with the bridge having the horizontally arranged pintles formed thereon between its central portion and its points of attachment to the lenses, of nose-guards journaled to turn on said pintles in planes approximately parallel to the plane of the lenses.

6. In eyeglasses or spectacles, the combination with the mounting provided with the pintles, of nose guards journaled on said pintles each embodying a nose-engaging portion, and a rolled or bent portion formed to loosely embrace a pintle of the mounting.

7. In eyeglasses or spectacles, the combination with the mounting provided with the pintles, of nose guards journaled to turn on said pintles, each embodying a nose-engaging portion, a doubled arm at one end of the said portion, and a bearing formed upon the doubled arm and engaging a pintle.

GEORGE BAUSCH.

Witnesses:
F. F. CHURCH,
H. E. KIRSTEIN.